US010694127B2

(12) United States Patent
     Tamaki

(10) Patent No.: US 10,694,127 B2
(45) Date of Patent: Jun. 23, 2020

(54) IMAGE CAPTURING APPARATUS, CONTROL METHOD, AND STORAGE MEDIUM FOR REDUCING THE SENSE OF INCONGRUITY FELT BY A LASER

(71) Applicant: CANON KABUSHIKI KAISHA, Tokyo (JP)

(72) Inventor: Yoshihito Tamaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/012,983

(22) Filed: Jun. 20, 2018

(65) Prior Publication Data

US 2018/0376086 A1    Dec. 27, 2018

(30) Foreign Application Priority Data

Jun. 27, 2017   (JP) ................................ 2017-125585

(51) Int. Cl.
*H04N 5/359*    (2011.01)
*H04N 5/353*    (2011.01)
(Continued)

(52) U.S. Cl.
CPC ....... *H04N 5/3597* (2013.01); *H04N 5/23212* (2013.01); *H04N 5/23293* (2013.01); *H04N 5/232122* (2018.08); *H04N 5/343* (2013.01); *H04N 5/353* (2013.01); *H04N 5/3535* (2013.01); *H04N 5/36961* (2018.08); *H04N 5/378* (2013.01)

(58) Field of Classification Search
CPC ........... H04N 5/3597; H04N 5/232122; H04N 5/36961; H04N 5/3535; H04N 5/343; H04N 5/23293; H04N 5/378; H04N 5/23212; H04N 5/353
See application file for complete search history.

(56) References Cited

U.S. PATENT DOCUMENTS

| 6,985,185 | B1 * | 1/2006 | Crawford | ............... H04N 5/235 |
|           |      |        |          | 348/362 |
| 2009/0109323 | A1 * | 4/2009 | Muraki | .................. G03B 7/003 |
|           |      |        |          | 348/362 |

(Continued)

FOREIGN PATENT DOCUMENTS

| JP | 2004-134867 A | 4/2004 |
| JP | 2015-144346 A | 8/2015 |

*Primary Examiner* — Gevell V Selby
(74) *Attorney, Agent, or Firm* — Cowan, Liebowitz & Latman, P.C.

(57) ABSTRACT

There is provided an image capturing apparatus. An image capturing control unit acquires a first image and a second image that require different time periods to read out electrical charge that accumulates due to exposure. A display control unit controls display of an image that is read out from an image sensor on a display unit. The second image has a lower resolution and requires a shorter time period for readout than the first image. The display control unit, when causing the display unit to cyclically display the first image and the second image, sets a first time period from readout of the second image to display start of the second image on the display unit, based on a difference between the time period to read out the first image and the time period to read out the second image.

8 Claims, 6 Drawing Sheets

(51) Int. Cl.
*H04N 5/232* (2006.01)
*H04N 5/378* (2011.01)
*H04N 5/343* (2011.01)
*H04N 5/369* (2011.01)

(56) References Cited

U.S. PATENT DOCUMENTS

| | | | | |
|---|---|---|---|---|
| 2013/0002655 A1* | 1/2013 | Choi | .................... | H04N 13/341 |
| | | | | 345/419 |
| 2015/0156405 A1* | 6/2015 | Izawa | .................... | H04N 5/232 |
| | | | | 348/246 |
| 2015/0215545 A1* | 7/2015 | Hayashi | ............. | H04N 5/23296 |
| | | | | 348/240.3 |

* cited by examiner

IMAGE CAPTURING APPARATUS, CONTROL METHOD, AND STORAGE MEDIUM FOR REDUCING THE SENSE OF INCONGRUITY FELT BY A LASER

BACKGROUND OF THE INVENTION

Field of the Invention

The present invention relates to an image capturing apparatus, a control method, and a storage medium.

Description of the Related Art

Image capturing apparatuses such as digital cameras are sometimes provided with a continuous shooting function of continuously shooting still images while performing automatic focus detection (on-imaging plane phase difference AF) employing an on-imaging plane phase difference system on a main object. During execution of this continuous shooting function, the image capturing apparatus sequentially reads out images to be displayed as live view (LV) images on a back monitor or the like and images for still image recording from an image sensor, and performs real-time display and recording.

A technique for improving tracking of the main object when images that are acquired from the image sensor while focus detection is performed during the continuous shooting are displayed on a monitor screen as the LV images is known. Japanese Patent Laid-Open No. 2015-144346 proposes a technique for switching whether images with different resolutions are successively displayed on a monitor or only high-resolution images are displayed on the monitor, in accordance with the frame rate. According to Japanese Patent Laid-Open No. 2015-144346, even in the continuous shooting at a low frame rate, it is possible to shorten the time interval between the display time periods of LV images, and to improve tracking of the main object during framing.

The time period required to acquire image data from an image sensor differs depending on the resolution. Thus, the image acquisition time period from an exposure start timing to an acquisition completion timing varies depending on the resolution of the image data. In Japanese Patent Laid-Open No. 2015-144346, image data having different resolutions are successively displayed at a low frame rate, and thus the image acquisition times will differ between the respective image data, and LV display will be performed using image data that is acquired at uneven time intervals, possibly leaving the user with a sense of incongruity.

SUMMARY OF THE INVENTION

The present invention has been made in light of such circumstances, and provides a technique for reducing the sense of incongruity felt by a user when images that require different time periods from exposure start to acquisition completion are sequentially displayed.

According to a first aspect of the present invention, there is provided an image capturing apparatus comprising: an image sensor; and at least one processor which functions as: an image capturing control unit configured to be able to acquire, by controlling exposure and readout that are performed using the image sensor, a first image and a second image that require different time periods to read out electrical charge that accumulates due to exposure: and a display control unit configured to control display of an image that is read out from the image sensor on a display unit, wherein the second image has a lower resolution and requires a shorter time period for readout than the first image, and wherein the display control unit, when causing the display unit to cyclically display the first image and the second image, sets a first time period from readout of the second image to display start of the second image on the display unit, based on a difference between the time period to read out the first image and the time period to read out the second image.

According to a second aspect of the present invention, there is provided a control method executed by an image capturing apparatus comprising an image sensor, the method comprising: acquiring, by controlling exposure and readout that are performed using the image sensor, a first image and a second image that require different time periods to read out electrical charge that accumulates due to exposure; and controlling display of an image that is read out from the image sensor on a display unit, wherein the second image has a lower resolution and requires a shorter time period for readout than the first image, and wherein in the controlling, when causing the display unit to cyclically display the first image and the second image, a first time period from readout of the second image to display start of the second image on the display unit is set based on a difference between the time period to read out the first image and the time period to read out the second image.

According to a third aspect of the present invention, there is provided a non-transitory computer-readable storage medium which stores a program for causing a computer to execute a control method comprising: acquiring, by controlling exposure and readout that are performed using an image sensor, a first image and a second image that require different time periods to read out electrical charge that accumulates due to exposure; and controlling display of an image that is read out from the image sensor on a display unit, wherein the second image has a lower resolution and requires a shorter time period for readout than the first image, and wherein in the controlling, when causing the display unit to cyclically display the first image and the second image, a first time period from readout of the second image to display start of the second image on the display unit is set based on a difference between the time period to read out the first image and the time period to read out the second image.

Further features of the present invention will become apparent from the following description of exemplary embodiments with reference to the attached drawings.

DESCRIPTION OF THE EMBODIMENTS

Hereinafter, embodiments of the present invention will be described with reference to the attached drawings. It should be noted that the technical scope of the present invention is defined by the claims, and is not limited by the following respective embodiments. Also, not all of the combinations of the aspects that are described in the embodiments are necessarily essential to the present invention. Also, the aspects that are described in the respective embodiments can be combined as appropriate.

Also, for facilitating the understanding and description of the invention, the embodiments have concrete and specific configurations, but the present invention is not limited to such a specific configuration. For example, although embodiments in which the present invention is applied to a lens-interchangeable single-lens reflex digital camera will be described below, the present invention can be applied to a lens-uninterchangeable digital camera or a video camera. Also, the present invention can be implemented in any electronic device provided with a camera, such as, examples of which include a mobile phone, a personal computer (a laptop computer, a tablet terminal, a desktop computer, or the like), a gaming machine, or the like.

First Embodiment

Description of Configuration of Image Capturing Apparatus (Lens Unit)

Figure 1:
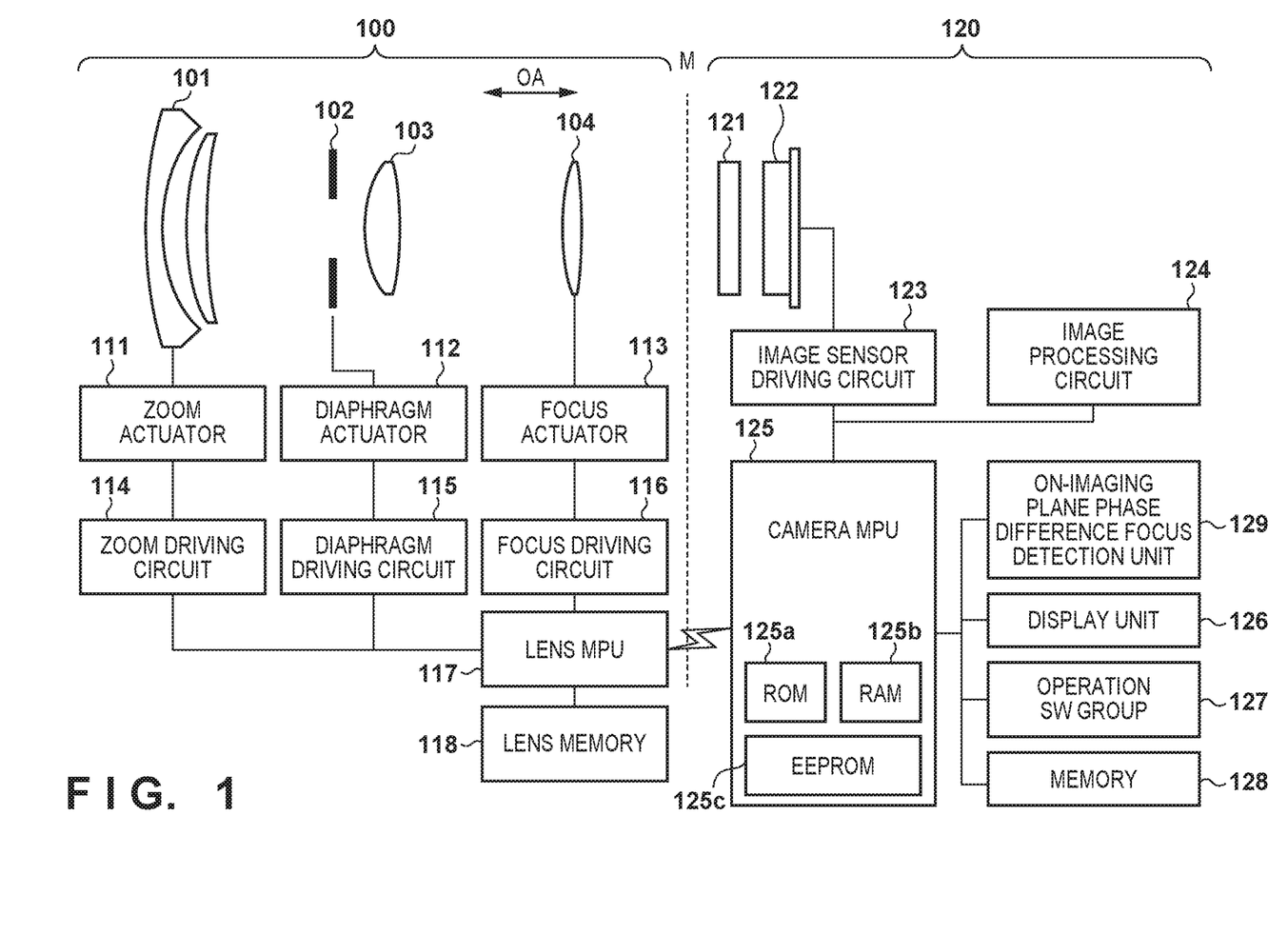
FIG. 1 is a block diagram showing a configuration of an image capturing apparatus.

FIG. 1 is a block diagram showing a configuration of an image capturing apparatus having the form of a camera system constituted by a camera main body in which a plurality of taking lenses are interchangeable, and a taking lens. The camera system (image capturing apparatus) of the present embodiment is a lens-interchangeable single reflex camera, and has a camera main body 120 and a lens unit 100 constituted by the taking lens. The lens unit 100 is mounted on the camera main body 120 via a mount M indicated by the dotted lines at the center of FIG. 1.

The lens unit 100 has an optical system (a first lens group 101, a diaphragm 102, a second lens group 103, and a third lens group (focus lens 104)), and a driving/control system. The first lens group 101 is disposed at a front end of the lens unit 100, and is held to be movable in an optical axis direction OA. The diaphragm 102 has a function of adjusting the light amount during image shooting, and has a function as a mechanical shutter for controlling the exposure time period during still image shooting. The diaphragm 102 and the second lens group 103 are integrally movable in the optical axis direction OA, and realizes a zoom function by moving in tandem with the first lens group 101. The focus lens 104 is also movable in the optical axis direction OA, and an object distance (focus distance) at which the lens unit 100 focuses changes depending on the position. Focus adjustment in which the focus distance of the lens unit 100 is adjusted can be performed by controlling the position of the focus lens 104 in the optical axis direction OA.

The driving/control system has a zoom actuator 111, a diaphragm actuator 112, a focus actuator 113, a zoom driving circuit 114, a diaphragm driving circuit 115, a focus driving circuit 116, a lens MPU 117 (processor), and a lens memory 118.

The zoom driving circuit 114 drives the first lens group 101 and the second lens group 103 in the optical axis direction OA using the zoom actuator 111, and controls the angle of view of the optical system of the lens unit 100. The diaphragm driving circuit 115 drives the diaphragm 102 using the diaphragm actuator 112, and controls the opening size of the diaphragm 102 and the operation of opening and closing the diaphragm 102. The focus driving circuit 116 drives the focus lens 104 in the optical axis direction OA using the focus actuator 113, and controls the focus distance of the optical system of the lens unit 100. Also, the focus driving circuit 116 detects the current position of the focus lens 104 using the focus actuator 113.

The lens MPU 117 performs overall calculation and control relating to the lens unit 100, and controls the zoom driving circuit 114, the diaphragm driving circuit 115, and the focus driving circuit 116. Also, the lens MPU 117 is connected to a camera MPU 125 through the mount M, and communicates commands and data. For example, the lens MPU 117 detects the position of the focus lens 104, and communicates lens position information in response to a request from the camera MPU 125. This lens position information includes information such as the position of the focus lens 104 in the optical axis direction OA, the position and the diameter of the exit pupil in the optical axis direction OA in a state in which the optical system is not moving, and the position and the diameter of a lens frame for limiting the luminous flux of the exit pupil in the optical axis direction OA. Also, the lens MPU 117 controls the zoom driving circuit 114, the diaphragm driving circuit 115, and the focus driving circuit 116 in response to a request from the camera MPU 125. Optical information required for on-imaging plane phase difference AF is stored in the lens memory 118 in advance. The lens MPU 117 controls the operation of the lens unit 100 by executing a program stored in a built-in non-volatile memory or the lens memory 118, for example.

Description of Configuration of Image Capturing Apparatus (Camera Main Body)

The camera main body 120 has an optical system (an optical low-pass filter 121 and an image sensor 122) and a driving/control system. The optical low-pass filter 121 reduces false color and moire of a captured image. The image sensor 122 is constituted by a CMOS image sensor and peripheral circuits, and m pixels are disposed in the horizontal direction and n pixels are disposed in the vertical direction (n and m are integers of two or more). The image sensor 122 of the present embodiment has a pupil division function, and can perform on-imaging plane phase difference AF using image data having parallax.

The driving/control system has an image sensor driving circuit 123, an image processing circuit 124, a camera MPU 125 (processor), a display unit 126, an operation switch group 127, a memory 128, and an on-imaging plane phase difference focus detection unit 129. The image processing circuit 124 generates a focus detection signal and image data for display and recording, from the image data output from the image sensor 122.

The image sensor driving circuit 123 controls the operation of the image sensor 122, and performs A/D conversion on acquired image data and transmits the resultant image data to the camera MPU 125. The image processing circuit 124 performs general image processing that is performed in a digital camera, such as gamma conversion, white balance adjustment processing, color interpolation processing, and compression encoding processing, on the image data acquired by the image sensor 122.

The camera MPU 125 performs overall calculation and control relating to the camera main body 120, and controls the image sensor driving circuit 123, the image processing circuit 124, the display unit 126, the operation switch group 127, the memory 128, and the on-imaging plane phase difference focus detection unit 129. The camera MPU 125 is connected to the lens MPU 117 via the mount M, and communicates commands and data to the lens MPU 117. The camera MPU 125 issues, to the lens MPU 117, a lens position acquisition request, an aperture at a predetermined driving amount, a focus lens, a zoom driving request, a request to acquire optical information unique to the lens unit 100, and the like. The camera MPU 125 include a ROM 125a in which programs for controlling the operation of the camera main body 120 are stored, a RAM 125b in which variables are stored, and an EEPROM 125c in which various parameters are stored.

The display unit 126 is constituted by an LCD or the like, and displays information relating to a shooting mode of the camera main body 120, a preview image before shooting and an image for checking after shooting, a focused state image during focus detection, and the like. The operation switch group 127 is constituted by a power source switch, a release (shooting trigger) switch, a zoom operation switch, a shooting mode selection switch, and the like. The memory 128 is a removable flash memory, and records captured images.

The on-imaging plane phase difference focus detection unit 129 performs focus detection processing through on-imaging plane phase difference AF based on an on-imaging plane phase difference AF signal obtained by the image processing circuit 124. Specifically, the image processing circuit 124 generates a pair of image data that is formed by luminous flux passing through a pair of pupil regions of the shooting optical system as the on-imaging plane phase difference AF signal, and the on-imaging plane phase difference focus detection unit 129 detects a focus deviation amount (defocus amount) based on the deviation amount of this pair of image data. In this manner, the on-imaging plane phase difference focus detection unit 129 of the present embodiment performs on-imaging plane phase difference AF based on the output from the image sensor 122 without using a dedicated AF sensor.

Description of Focus Detection Operation (On-Imaging Plane Phase Difference AF)

Figure 2:
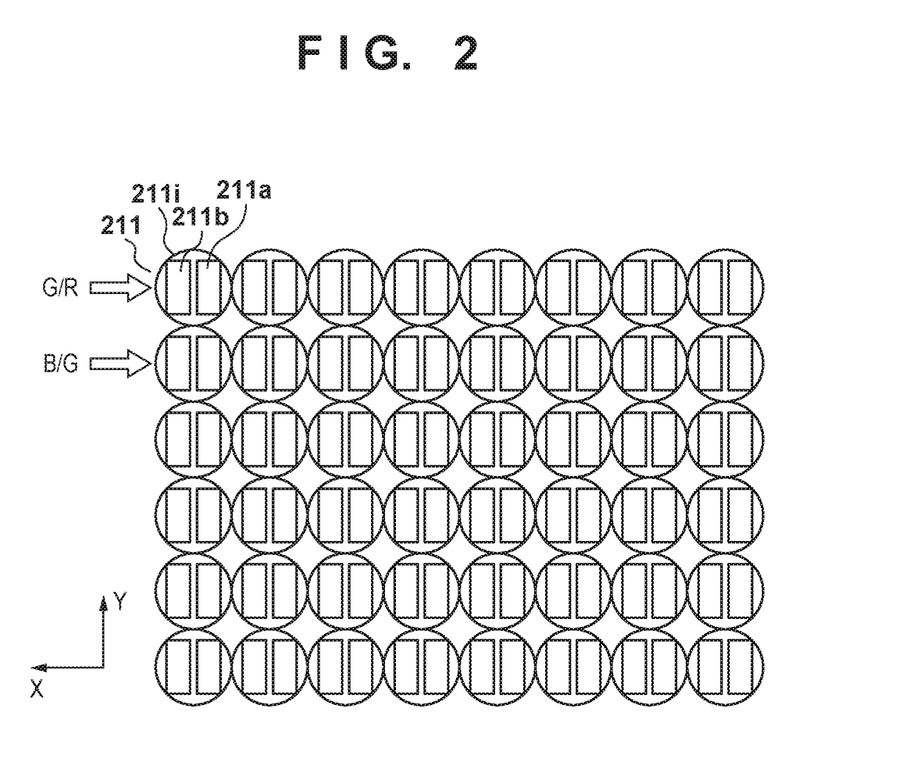
FIG. 2 is a diagram showing a pixel array of an image sensor 122.

The operation of the on-imaging plane phase difference focus detection unit 129 will be described in detail with reference to FIG. 2. FIG. 2 is a diagram showing a pixel array of the image sensor 122 in the present embodiment, and shows the state in which a range having 6 rows vertically (Y direction) and 8 columns horizontally (X direction) of a two-dimensional C-MOS area sensor is observed from the lens unit 100 side. The image sensor 122 is provided with color filters in a Bayer array. In the Bayer array of the present embodiment, a green (G) color filter and a red (R) color filter are alternatingly arranged in pixels in odd rows in the X direction in order from the left, and a blue (B) color filter and a green (G) color filter are alternatingly arranged in pixels in even rows in the X direction in order from the left. In a pixel 211, a circle indicated by reference numeral 211i represents an on-chip microlens, and a plurality of rectangles (reference numerals 211a and 211b) arranged inside the on-chip microlens 211i each represent a photoelectric conversion part.

The image sensor 122 of the present embodiment has first and second focus detection pixels that receive luminous flux that respectively passes through different partial pupil regions of shooting optical systems. Note that the present embodiment has a configuration in which the photoelectric conversion parts of all of the pixels in the image sensor 122 are each divided into two regions in the X direction, and a photoelectric conversion signal of one of the divided regions and the sum of the two photoelectric conversion signals can be read out independently. However, a configuration is possible in which the photoelectric conversion parts are each divided into a plurality of parts in the X direction and the Y direction. Moreover, with regard to the signals that are read out independently, a difference between the sum of the two photoelectric conversion signals and the photoelectric conversion signal of the one divided region is obtained, and thereby a signal corresponding to the signal obtained in the other photoelectric conversion region can be obtained. The photoelectric conversion signals of these divided regions are used in phase difference focus detection with a method that will be described later, and can generate a 3D (3-dimensional) image constituted by a plurality of images having parallax information. On the other hand, the sum of the two photoelectric conversion signals is used as a normally captured image.

Herein, the on-imaging plane phase difference AF signal will be described. In the present embodiment, the on-chip microlens 211i shown in FIG. 2 and the divided photoelectric conversion parts 211a and 211b perform pupil division on exit luminous flux of the shooting optical system. Then, with regard to a plurality of pixels 211 in a predetermined range that are arranged in the same pixel row, an image obtained by connecting and organizing the outputs from the photoelectric conversion parts 211a is set as an image A for on-imaging plane phase difference AF (image A for AF). Also, an image obtained by connecting and organizing the outputs from the photoelectric conversion parts 211b is set as an image B for on-imaging plane phase difference AF (image B for AF). A pseudo luminance (Y) signal calculated by adding the green, red, blue, and green outputs that are included in the unit array of the color filters is used as the output of the photoelectric conversion parts 211a and 211b. However, the image A for AF and the image B for AF may be organized for each color red, blue, and green. By detecting, through a correlation operation, a relative image deviation amount between the image A for AF and the image B for AF that have been generated in this manner, a focus deviation amount (defocus amount) of a predetermined region can be detected. In the present embodiment, it is assumed that the output from one of the photoelectric conversion parts and the sum of the outputs from both of the photoelectric conversion parts are read out from the image sensor 122. For example, if the output of the photoelectric conversion part 211a and the sum of the outputs of the photoelectric conversion parts 211a and 211b are read out, the output of the photoelectric conversion part 211b is acquired by subtracting the output of the photoelectric conversion parts 211a from the sum. Accordingly, it is possible to obtain both the image A for AF and the image B for AF, and to realize on-imaging plane phase difference AF. Such an image sensor is known as disclosed in Japanese Patent Laid-Open No. 2004-134867, for example, and thus further detailed description thereof will be omitted.

Note that although a configuration in which the exit pupil is divided into two regions in the horizontal direction was described as one example here, a configuration is possible in which, with regard to some of the pixels in the image sensor 122, the exit pupil is divided into two regions in the vertical direction. Also, a configuration is possible in which the exit pupil is divided in both the horizontal direction and the vertical direction. By providing pixels in which the exit pupil is divided in the vertical direction, on-imaging plane phase difference AF corresponding to the contrast of an object not only in the horizontal direction but also in the vertical direction is possible.

As described above, the image sensor 122 has not only an image capturing function but also a function as a focus detection apparatus. Note that, as the focus detection method, focus detection pixels whose exit pupils are divided and that receive luminous flux are provided, and thus on-imaging plane phase difference AF can be performed.

Continuous Shooting Processing

Next, continuous shooting processing executed by the camera main body 120 will be described with reference to FIG. 3. In the continuous shooting processing in FIG. 3, the camera main body 120 alternatingly acquires and displays recording images and AF images. The AF image has a lower resolution than the recording image. Thus, the time period required from exposure start to acquisition completion with regard to the AF image is shorter than the time period required from exposure start to acquisition completion with regard to the recording image. In other words, the AF image (LV image) requires a shorter time period to read out the electrical charge accumulated in the image sensor 122 due to exposure, than the recording image (still image). Thus, even if the exposure time periods of the recording image and the AF image are substantially the same, the readout time period of the image data differs depending on the resolution (the difference in the number of readout rows or the like).

Note that images that are acquired and displayed in the continuous shooting processing in the present embodiment are not limited to the recording image and the AF image, and need only include at least two types of image that require different time periods from exposure start to acquisition completion. For example, a configuration is possible in which if continuous acquisition of still images is instructed during successive display (during LV display) of display images, the recording images and the LV display images are alternatingly displayed. In order to reduce the processing load in the case of acquiring the LV display images, the camera main body 120 acquires the images by thinning out accumulated/readout rows of the image sensor 122 or adding the readout rows, in comparison with the rows accumulated, readout when the recording images are acquired. Thus, even if an LV display image has the same exposure time period as a recording image (still image), the LV display image requires a shorter time period from exposure start to acquisition completion than the recording image. That is, the time period required from exposure end to readout completion is shorter for the AF image (LV image) than the recording image (still image). If such a configuration is adopted, a configuration in which the image sensor 122 is not provided with pixels for focus detection is possible.

Also, the present embodiment is not limited to the configuration in which the recording images and the AF images are alternatingly acquired and displayed. For example, the camera main body 120 may acquire two or more AF images following the acquisition of one recording image.

Figure 3:
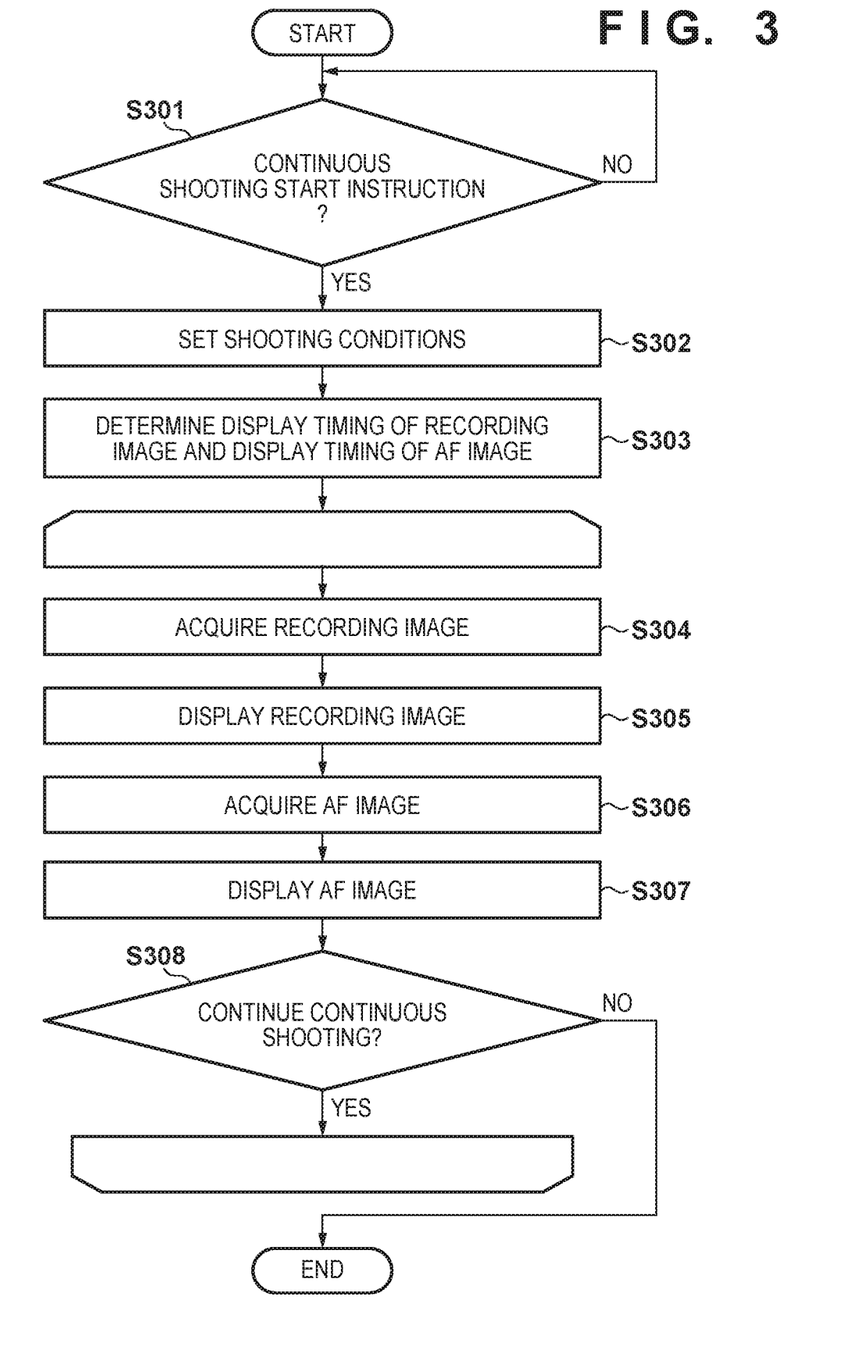
FIG. 3 is a flowchart of continuous shooting processing executed by a camera main body 120.

FIG. 3 is a flowchart of the continuous shooting processing executed by the camera main body 120. In this flowchart, processes of the steps are realized by the camera MPU 125 controlling the units of the camera main body 120 in accordance with a program stored in the ROM 125a and communicating with the lens MPU 117, unless otherwise stated.

In step S301, the camera MPU 125 waits to be instructed to start the continuous shooting, and when instructed to start the continuous shooting, the camera MPU 125 advances the processing to step S302. A user can instruct the camera main body 120 to start continuous shooting by operating the operation switch group 127, for example. In step S302, the camera MPU 125 sets shooting conditions such as a shutter second time Tv and an aperture value F. In step S303, the camera MPU 125 determines the timing for displaying the recording images and the AF images. Note that a configuration may be adopted in which only the AF images (LV images), which will be described later, or the recording images (still images) are continuously displayed as an operation in the case where starting continuous shooting is not instructed, for example.

Figure 4:
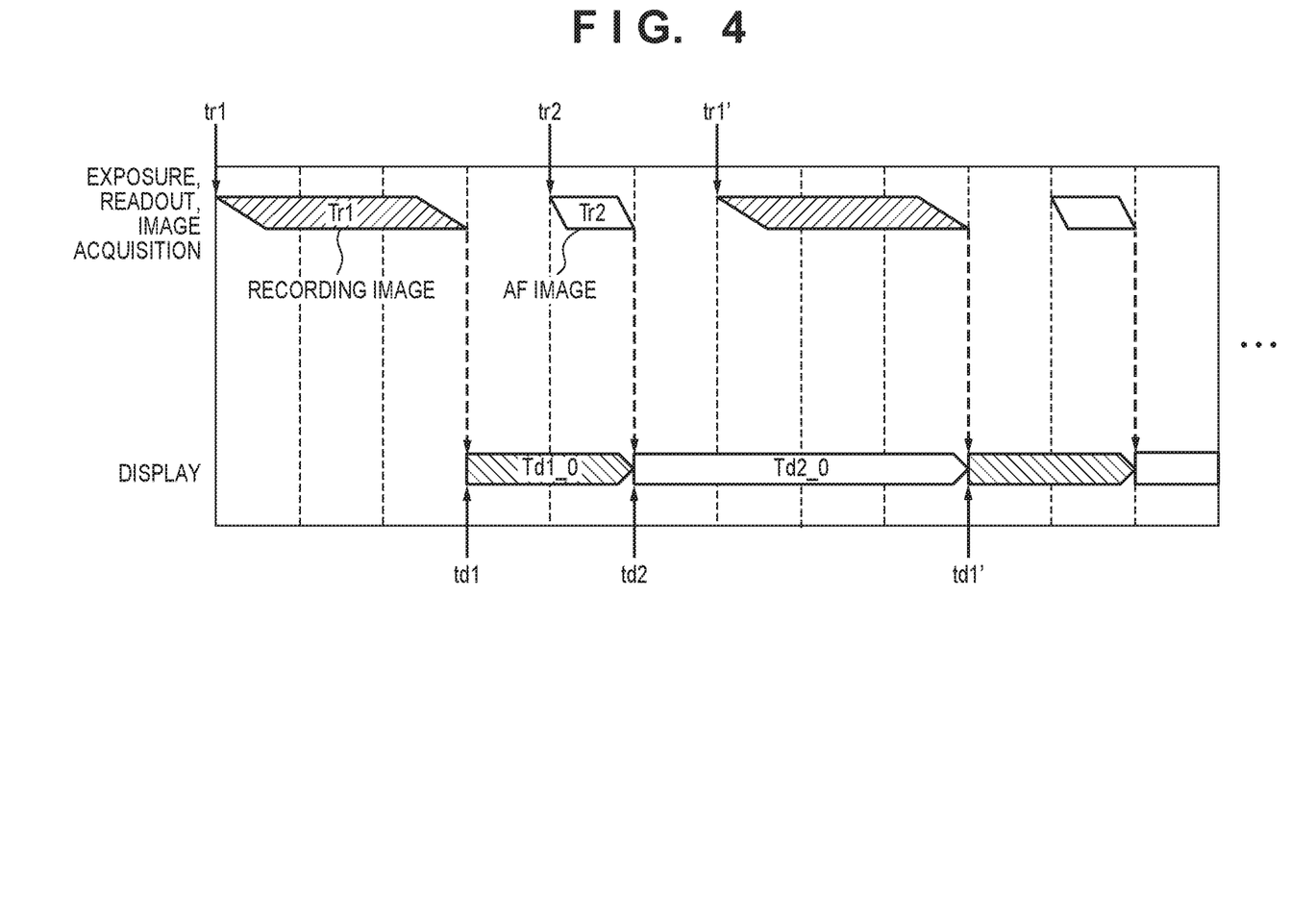
FIG. 4 is a timing chart of conventional continuous shooting processing.

Here, detailed processing of step S303 will be described with reference to FIGS. 4 and 5. FIG. 4 shows a timing chart of conventional continuous shooting processing, and FIG. 5 shows a timing chart of the continuous shooting processing according to the first embodiment.

Figure 5:
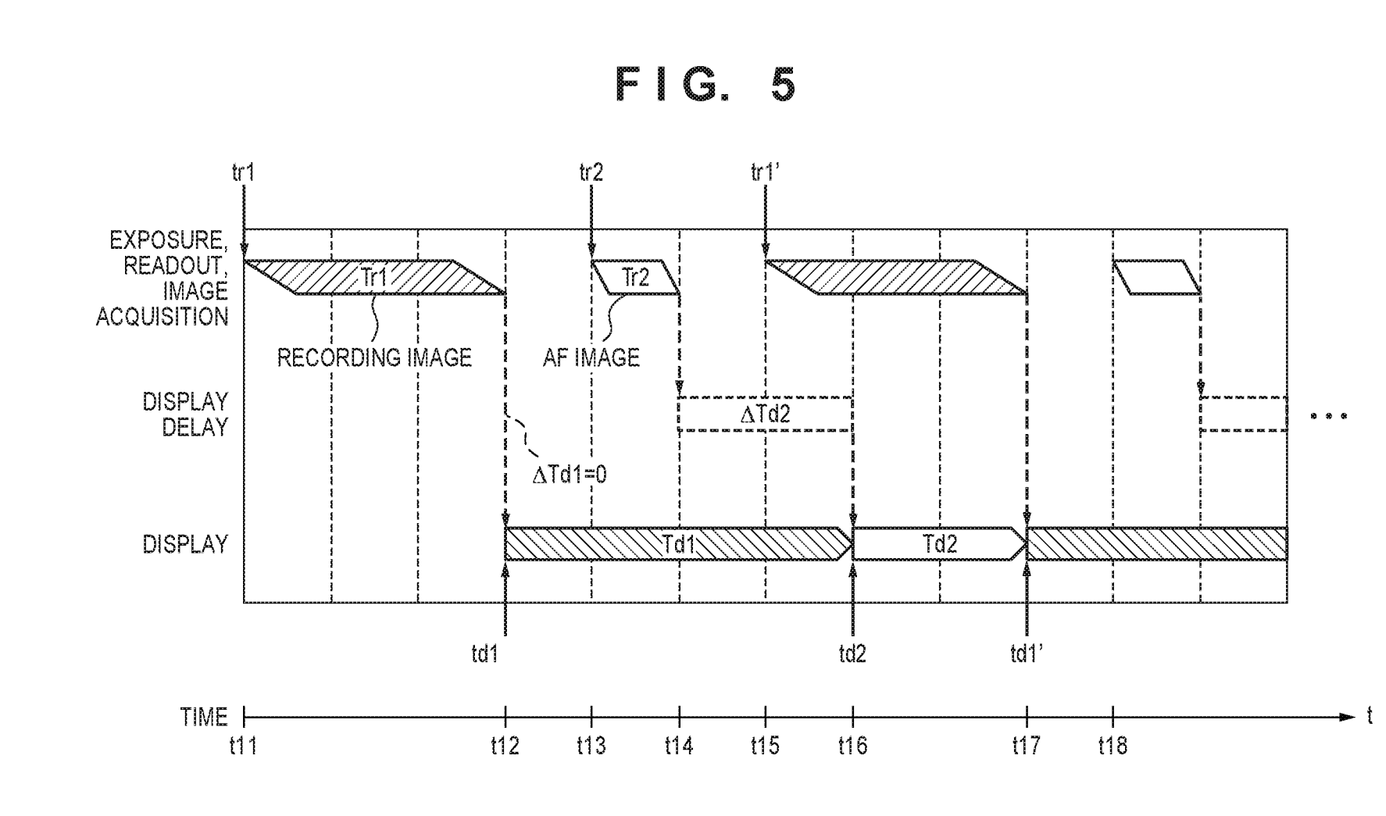
FIG. 5 is a timing chart of continuous shooting processing according to a first embodiment.

In FIGS. 4 and 5, shaded blocks indicate processing relating to the recording images, and white blocks indicate processing relating to the AF images. Tr1 and Tr2 respectively indicate the time period for exposure, readout, and image acquisition (the time period required from exposure start to acquisition completion) of the recording image and the AF image. tr1 and tr1' indicate the exposure start times of the recording image, and tr2 indicates the exposure start time of the AF image. td1 and td1' indicate the display start times of the recording image, and td2 indicates the display start time of the AF image. Note that in the present embodiment, the barycenters of the periods required from exposure start of the image data to readout completion of the image data (in other words, the exposure barycenters) are adjusted so as to be located at substantially equal intervals for the recording image and for the AF image. This is to prevent, the motion of the object displayed on the display unit 126 from irregularly changing due to differences in the time period required from exposure start to readout, in the case where the object is moving body, for example.

Also, in FIG. 4. Td1_0 indicates the display time period of the recording image, and Td2_0 indicates the display time period of the AF image. In FIG. 5, Td1 indicates the display time period of the recording image, and Td2 indicates the display time period of the AF image. ΔTd1 in FIG. 5 indicates the display delay time period of the recording image (the time period from acquisition completion of the recording image to display start of the recording image), and ΔTd2 indicates the display delay time period of the AF image (the time period from acquisition completion of the AF image to display start of the AF image). Note that although ΔTd1=0 in the example of FIG. 5, the present embodiment is not limited to ΔTd1=0. t11 to t18 in FIG. 5 each indicates a time. Note that although time t11 to time t18 are shown in FIG. 5, if, in step S308, which will be described later, it is determined to continue the continuous shooting, the continuous shooting processing also continues at time t18 onward. Also, although a delay time period relating to the display of each image can be controlled using, as one unit, a IV period of a vertical synchronization signal when the image sensor 122 is driven in the present embodiment, the delay time period may be set with reference to another time period.

In step S303, the camera MPU 125 determines the display timing of the recording image and the AF image. More specifically, the camera MPU 125 determines the display delay time period ΔTd1 of the recording image, the display delay time period ΔTd2 of the AF image, the display time period Td1 of the recording image, and the display time period Td2 of the AF image. Note that in the present embodiment, it is assumed that the display time period Td1 of the recording image continues until the display start time td2 of the AF image, and the display time period Td2 of the AF image continues until the display start time td1' of the recording image. Thus, if the display delay time periods ΔTd1 and ΔTd2 are determined, the display time periods Td1 and Td2 are also automatically determined, and thus the camera MPU 125 substantively need only determine the display delay time periods ΔTd1 and ΔTd2.

In the example of FIG. 5, the camera MPU 125 determines the display delay time periods ΔTd1 and ΔTd2 such that a time period from the exposure start time tr2 of the AF image to the display start time td2 of the AF image (td2−tr2=Tr2+ΔTd2) is equal to a time period from the exposure start time tr1 of the recording image to the display start time td1 of the recording image (td1−tr1=Tr1+ΔTd1). Moreover, the camera MPU 125 calculates the display time periods Td1 and Td2 based on the display delay time periods ΔTd1 and ΔTd2. With this configuration, even though the readout time periods of the two types of image differ, it is possible to reduce the temporal difference required until the AF image and the recording image are displayed, which is caused by the difference between the readout time periods. Specifically, the camera MPU 125 acquires the time period Tr1 from exposure start of the recording image to acquisition completion of the recording image and the time period Tr2 from exposure start of the AF image to acquisition completion of the AF image based on the shooting conditions set in step S302. Then, the camera MPU 125 determines the display delay time period ΔTd1 of the recording image as 0 (as described above, it may be other than 0). The camera MPU 125 then calculates the display delay time period ΔTd2 of the AF image in accordance with Equation 1 below.

$$Tr2+\Delta Td2=Tr1+\Delta Td1$$

$$\Delta Td2=Tr1+\Delta Td1-Tr2=Tr1-Tr2 \quad (1)$$

Next, the camera MPU 125 calculates the display time period Td1 of the recording image and the display time period Td2 of the AF image. Specifically, the camera MPU 125 acquires the display time periods Td1_0 and Td2_0 (see FIG. 4) in the case where the display delay time periods ΔTd1 and ΔTd2 are not present based on the shooting conditions set in step S302. The camera MPU 125 then calculates the display time periods Td1 and Td2 in accordance with Equation 2 below.

$$Td1=Td1\_0+(\Delta Td2-\Delta Td1)=Td1\_0+\Delta Td2$$

$$Td2=Td2\_0+(\Delta Td1-\Delta Td2)=Td1\_0-\Delta Td2 \quad (2)$$

In step S304 to step S307, the recording images and the AF images are successively acquired and successively displayed in accordance with the display timing determined in step S303. The processing from step S304 to step S307 is repeatedly executed until in step S308, it is determined that continuous shooting is not continued. Also, the camera MPU 125 records the recording image in the memory 128 and performs on-imaging plane phase difference AF based on the AF image, in parallel with the processing from step S304 to step S307.

In step S304, the camera MPU 125 performs image capturing control for acquiring the recording image (the image sensor 122 is exposed, read out, or the like). The image sensor 122 is exposed using a rolling shutter or a global shutter. The recording image is acquired between the exposure start time tr1 (t11) and the acquisition completion time t12.

In step S305, the camera MPU 125 sets the display start time of the recording image and the display time period of the recording image based on the display delay time period ΔTd1 and the display time period Td1 that have been determined in step S303, and instructs the display unit 126 to perform display. Specifically, the camera MPU 125 starts the display of the recording image at time t12, and gives a display instruction for continuing the display until time t16.

Note that strictly speaking, during step S304 and step S305, the camera MPU 125 performs processing for converting the acquired recording image into a data format suitable for the display on the display unit 126. The time period required for this conversion processing can be handled including in the time period Tr1 required from the exposure start of the recording image to the acquisition completion of the recording image. Also, in step S305, processing in which the acquired recording image is converted into an appropriate data format and recorded in the memory 128 is also performed in parallel therewith.

In step S306, the camera MPU 125 performs image capturing control for acquiring the AF image (the image sensor 122 is exposed, read out, or the like). The image capturing control herein is similar to the image capturing control in step S304, except for portions relating to a difference between the AF image and the recording image. The AF image is acquired between the exposure start time tr2 (t13) and the acquisition completion time t14.

In step S307, the camera MPU 125 sets the display start time of the AF image and the display time period of the AF image based on the display delay time period ΔTd2 and the display time period Td2 that have been determined in step S303, and instructs the display unit 126 to perform display. Specifically, the camera MPU 125 starts the display of the AF image at time t16, and gives a display instruction for continuing the display until time t17.

Note that strictly speaking, during step S306 and step S307, the camera MPU 125 performs processing for converting the acquired AF image into a data format suitable for the display on the display unit 126. The time period required for this conversion processing can be handled including in the time period Tr2 required from the exposure start of the AF image to the acquisition completion of the AF image. Also, in step S307, the on-imaging plane phase difference AF based on the acquired AF image is also performed in parallel therewith.

In step S308, the camera MPU 125 determines whether or not to continue continuous shooting. The user can switch between continuing and ending of continuous shooting by operating the operation switch group 127, for example. If continuous shooting is continued, the camera MPU 125 returns the processing to step S304, and if continuous shooting is not continued, the processing of this flowchart ends.

As described above, according to the first embodiment, the camera main body 120 acquires the recording image and the AF image that require different time periods from exposure start to acquisition completion (different time periods for readout), in the processing in which a plurality of images are successively acquired and successively displayed (display control). Then, when the recording image and the AF image, which was acquired next, are displayed, the camera main body 120 performs control such that the time period from exposure start of the AF image to display start of the AF image is equal to the time period from exposure start of the recording image to display start of the recording image. Accordingly, it is possible to reduce the sense of incongruity felt by the user.

Note that although the configuration in which control is performed such that the time period from exposure start of the AF image to display start of the AF image is equal to the time period from exposure start of the recording image to display start of the recording image was described above, the present embodiment is not limited to this configuration. By performing control such that the absolute value of a difference between the time period from exposure start of the AF image to display start of the AF image and the time period from exposure start of the recording image to display start of the recording image is reduced by any amount possible, it is possible to reduce the sense of incongruity felt by the user to some extent. As shown in FIG. 4, conventionally, the absolute value of the difference is equal to a time period (Tr1−Tr2) obtained by subtracting the time period from exposure start of the AF image to acquisition completion of the AF image from the time period from exposure start of the recording image to acquisition completion of the recording image. Thus, the camera main body 120 performs control such that the absolute value of the difference is less than the time period obtained by subtracting the time period from exposure start of the AF image to acquisition completion of the AF image from the time period from exposure start of the recording image to acquisition completion of the recording image. In this case, the camera main body 120 may further perform control such that the time period required from exposure start of the AF image to display start of the AF image is less than or equal to the time period required from exposure start of the recording image to display start of the recording image. Such control makes it possible to reduce the sense of incongruity felt by to the user to some extent.

Second Embodiment

In a second embodiment, a configuration that reduces the sense of congruity felt by a user by equalizing intervals between the display start time of the recording image and the display start time of the AF image will be described. In the present embodiment, the basic configuration of an image capturing apparatus (FIG. 1) is similar to that of the first embodiment. Hereinafter, differences between the first embodiment and the second embodiment will be mainly described.

Figure 6:
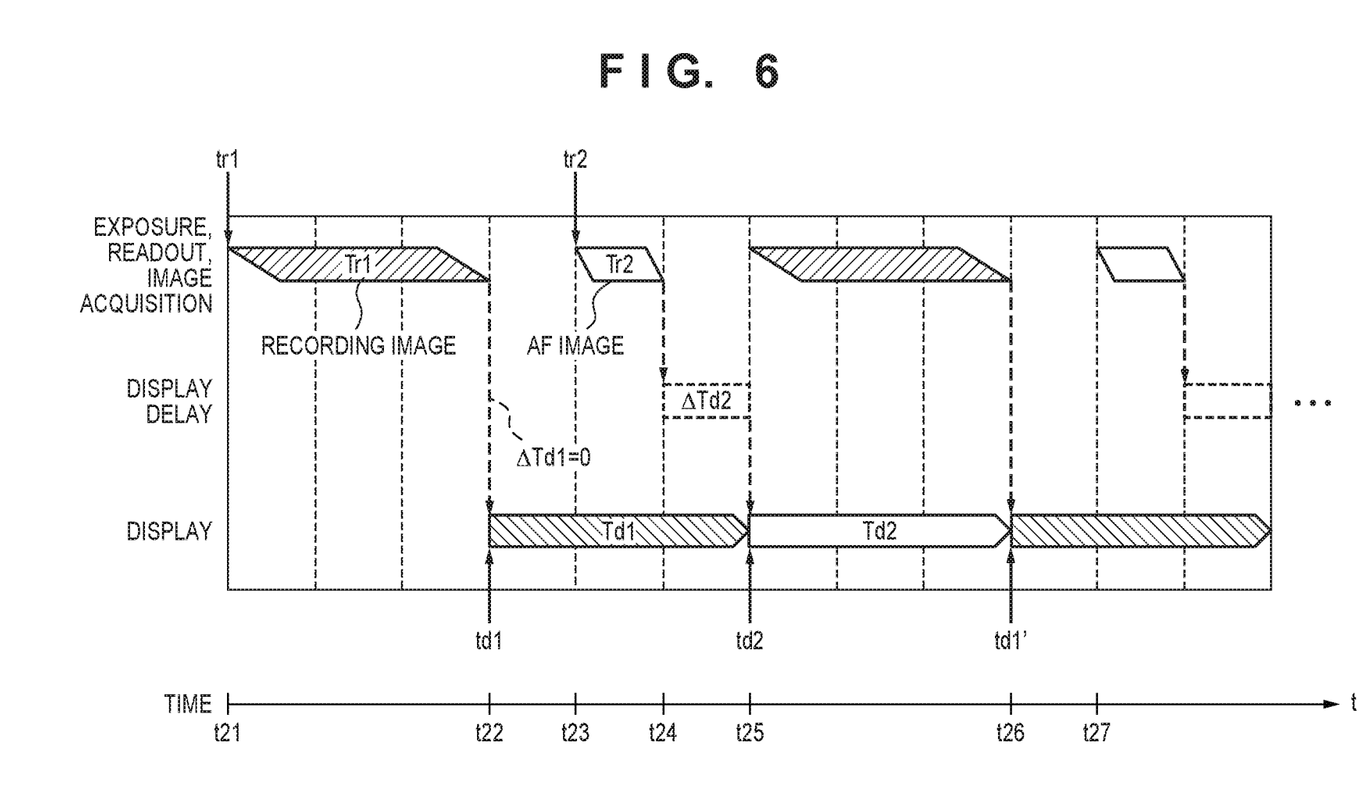
FIG. 6 is a timing chart of continuous shooting processing according to a second embodiment.

The second embodiment differs from the first embodiment in processing, in step S303 of FIG. 3, for determining the display timing of the recording image and the display timing of the AF image. FIG. 6 shows a timing chart of continuous shooting processing according to the second embodiment. FIG. 6 differs from FIG. 5 in a display time period Td1 of the recording image and a display time period Td2 of the AF image, and display start time td2 of the AF image. t21 to t27 in FIG. 6 each indicate a time. Note that although time t21 to time t27 are shown in FIG. 6, similarly to the first embodiment, if, in step S308, it is determined to continue continuous shooting, continuous shooting processing also continues at time t27 onward. In the second embodiment, the camera MPU 125 performs control such that a time period from display start time td1 of the recording image to display start time td2 of the AF image is equal to a time period from display start time td2 of the AF image to display start time td1' of the recording image.

The processing of step S301 and step S302 shown in FIG. 3 is similar to that of the first embodiment. In step S303, the camera MPU 125 determines a display delay time period ΔTd1 of the recording image, a display delay time period ΔTd2 of the AF image, the display time period Td1 of the recording image, and the display time period Td2 of the AF image. Specifically, the camera MPU 125 determines the display delay time period ΔTd1 of the recording image. Herein, similarly to the first embodiment, it is assumed that ΔTd1=0 holds true. Then, based on the shooting conditions that have been set in step S302, the camera MPU 125 adds ΔTd1 to the acquisition completion time of the recording image, and thereby calculates the display start times td1 and td1' of the recording image. The camera MPU 125 then determines the display start time td2 of the AF image as the intermediate time between the display start times td1 and td1' of the recording image. The camera MPU 125 calculates the display delay time period ΔTd2 of the AF image, the display time period Td1 of the recording image, and the display time period Td2 of the AF image based on the display start times td1, td2, and td1'.

The processing of step S304 onward is similar to that of the first embodiment, except that the display timing determined in step S303 is different from that of the first embodiment. As shown in FIG. 6, the recording images and the AF images are successively displayed at equal intervals.

As described above, according to the second embodiment, the camera main body 120 performs control such that the time period from display start time td1 of the recording image to display start time td2 of the AF image is equal to the time period from display start time td2 of the AF image to display start time td1' of the recording image. Accordingly, the display intervals of a plurality of images become equal, and thus it is possible to reduce the sense of incongruity felt by the user.

Note that in the above-described embodiments, the configuration was described in which the AF image is provided with a display delay time period based on a difference between the time period from exposure start of the recording image (still image) to display end of the recording image and the time period from exposure start of the AF image (LV image) to display end of the AF image. It is sufficient that the present invention has at least a configuration in which, in the case where a plurality of types of images with different readout time periods are displayed in order in a predetermined period, a delay time period (first time period) required from readout completion (acquisition completion) of the LV image to display start of the LV image is adjusted based on a difference between the respective readout time periods, for example. Even though the plurality of images with different readout time periods are alternatingly displayed, for example, this adjustment makes it possible to reduce a temporal difference from exposure start to display start with regard to the images, and thus to suppress the sense of incongruity felt by the user who looks at the display of these images.

Also, although the example in which two types of images that require different time periods from exposure end to readout completion are alternatingly displayed was described in the above-described embodiments, the present invention is not limited thereto. For example, the configurations of the above-described embodiments can be applied to even the case where two types of images that require different time periods from exposure end to readout completion are cyclically displayed in order at predetermined intervals.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-125585, filed Jun. 27, 2017, which is hereby incorporated by reference herein in its entirety.

What is claimed is:

1. An image capturing apparatus comprising:
an image sensor; and
at least one processor which functions as:
an image capturing control unit configured to be able to acquire, by controlling exposure and readout that are performed using the image sensor, a first image and a second image that require different time periods to read out electrical charge that accumulates due to exposure; and
a display control unit configured to control display of an image that is read out from the image sensor on a display unit,
wherein the second image has a lower resolution and requires a shorter time period for readout than the first image,
wherein the display control unit, when causing the display unit to cyclically display the first image and the second image, sets a first time period from completion of readout of the second image to display start of the second image on the display unit, based on a difference between the time period to read out the first image and the time period to read out the second image, and
wherein the first time period is longer than a second time period from completion of readout of the first image to display start of the first image on the display unit.

2. The image capturing apparatus according to claim 1, wherein the display control unit, when displaying the first image and the second image, performs control such that a time period required from readout start of the second image to display of the second image is less than or equal to a time period required from readout start of the first image to display of the first image.

3. The image capturing apparatus according to claim 1, wherein the display control unit, when displaying the first image and the second image, performs control such that a time period for which the second image is displayed on the display unit is substantially equal to a time period for which the first image is displayed on the display unit.

4. The image capturing apparatus according to claim 1, wherein the display control unit alternatingly displays the first image and the second image in a cyclic manner.

5. The image capturing apparatus according to claim 1, wherein the image capturing control unit performs control such that intervals between exposure barycenters of the first image and the second image, which are successively acquired using the image sensor, are substantially the same.

6. The image capturing apparatus according to claim 1, wherein
the image sensor has a plurality of focus detection pixels configured to receive luminous flux respectively passing through different partial pupil regions of a shooting optical system,
the first image is image data for recording, and
the second image is image data for focus detection having parallax.

7. A control method executed by an image capturing apparatus comprising an image sensor, the method comprising:
acquiring, by controlling exposure and readout that are performed using the image sensor, a first image and a second image that require different time periods to read out electrical charge that accumulates due to exposure; and
controlling display of an image that is read out from the image sensor on a display unit,
wherein the second image has a lower resolution and requires a shorter time period for readout than the first image,
wherein in the controlling, when causing the display unit to cyclically display the first image and the second image, a first time period from completion of readout of the second image to display start of the second image on the display unit is set based on a difference between the time period to read out the first image and the time period to read out the second image, and
wherein the first time period is longer than a second time period from completion of readout of the first image to display start of the first image on the display unit.

8. A non-transitory computer-readable storage medium which stores a program for causing a computer to execute a control method comprising:
acquiring, by controlling exposure and readout that are performed using an image sensor, a first image and a second image that require different time periods to read out electrical charge that accumulates due to exposure; and
controlling display of an image that is read out from the image sensor on a display unit,
wherein the second image has a lower resolution and requires a shorter time period for readout than the first image,
wherein in the controlling, when causing the display unit to cyclically display the first image and the second image, a first time period from completion of readout of the second image to display start of the second image on the display unit is set based on a difference between the time period to read out the first image and the time period to read out the second image, and
wherein the first time period is longer than a second time period from completion of readout of the first image to display start of the first image on the display unit.

* * * * *